H. F. DAVID.
Sauce Pan.
No. 11,961. Patented Nov. 21, 1854.
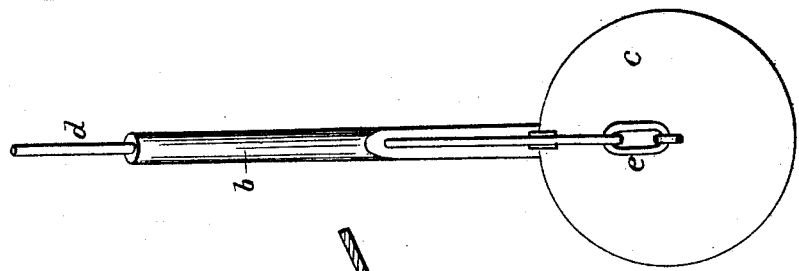
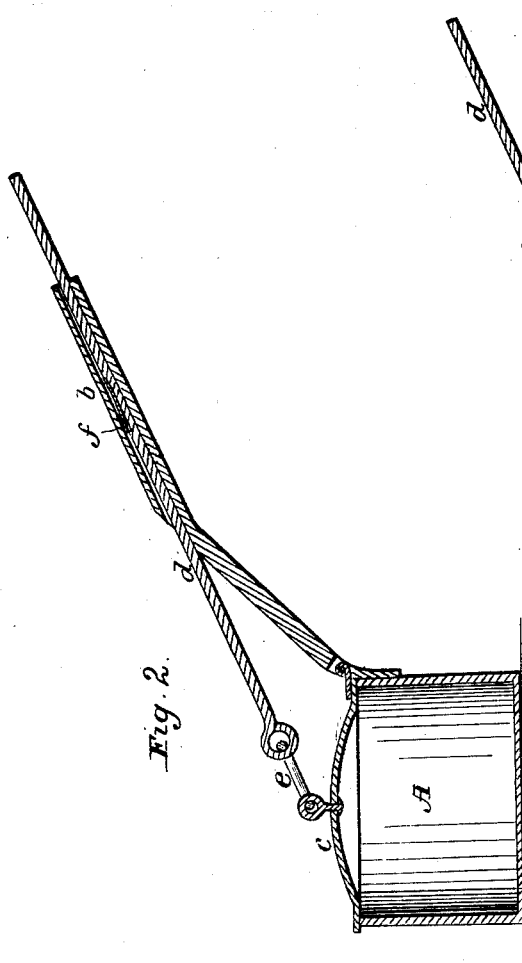
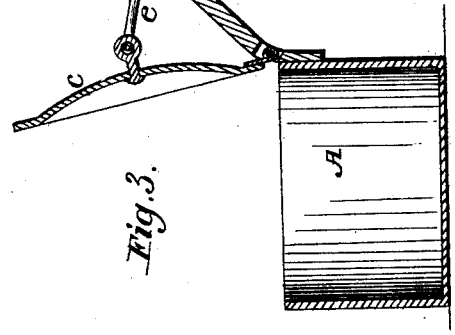

UNITED STATES PATENT OFFICE.

HENRY FARSON DAVID, OF IPAVA, ILLINOIS.

SAUCEPAN.

Specification of Letters Patent No. 11,961, dated November 21, 1854.

*To all whom it may concern:*

Be it known that I, HENRY F. DAVID, of Ipava, in the county of Fulton and State of Illinois, have invented a new and useful Improvement in Saucepans; and I do hereby declare that the following is a full and exact description thereof, reference being had to the accompanying drawings, making a part of this specification, Figure 1 being a top view of my improved sauce-pan, and Figs. 2 and 3 sections of the same, representing the cover of the pan in a closed and in an open position.

Similar letters indicate like parts in all the figures.

The nature of my invention consists in a new arrangement of parts by which the cover of a sauce pan can be more conveniently opened and also by which it can be retained in an open position; to wit; first hinging the cover at the base of the handle of the pan, and then hinging to the top of said cover, a rod $b$, which passes through and beyond the opening in the hollow handle of the pan;—the said rod being provided with a spring catch to retain the lid in an open position when desired.

In the accompanying drawings A, is the body of the sauce pan; $b$ is the hollow handle of the pan; $c$, is the cover of the pan; $d$, is the rod which passes through the hollow handle and is hinged to the cover by means of the link $e$; and $f$, is a spring catch secured to a recess in the rod $d$, in such a manner that when it is pressed inward, it will allow the rod to slide freely into the handle, $b$; and when the rod is drawn outward, to open the cover $c$, of the pan, the said catch will spring outward and retain the cover in an open position. The advantages of this arrangement, for readily opening, and retaining in an open position, the cover of a sauce or stew pan, are too palpable to require any elaboration.

What I claim as my invention and desire to secure by Letters Patent, is

My improved manner of opening and closing the cover of a sauce pan, or stew pan, and of retaining the same in an open position; viz; by means of the combination of said cover with the rod $d$, which passes through the hollow handle of the pan and is supplied with a spring catch, substantially as herein set forth.

The above specification of my improvement in sauce pans, signed and witnessed this 19th day of October 1854.

HENRY FARSON DAVID.

Witnesses:
 Z. C. ROBBINS,
 GEO. A. C. SMITH.